United States Patent
Joyce

(10) Patent No.: US 8,231,183 B2
(45) Date of Patent: Jul. 31, 2012

(54) TRACTION CONTROL METHOD

(75) Inventor: John Patrick Joyce, West Bloomfield, MI (US)

(73) Assignee: Ford Global Technologies, Dearborn, MI (US)

( * ) Notice: Subject to any disclaimer, the term of this patent is extended or adjusted under 35 U.S.C. 154(b) by 727 days.

(21) Appl. No.: 12/389,003

(22) Filed: Feb. 19, 2009

(65) Prior Publication Data
US 2010/0207447 A1 Aug. 19, 2010

(51) Int. Cl.
*B60T 8/64* (2006.01)
(52) U.S. Cl. ..... 303/151; 303/152; 303/177; 303/113.2; 701/70; 701/73
(58) Field of Classification Search ............... 303/151, 303/152, 146, 177, 112, 113.2; 701/22, 70, 701/71, 72, 73
See application file for complete search history.

(56) References Cited

U.S. PATENT DOCUMENTS

| 4,246,988 | A | 1/1981 | Hoppie |
| 4,962,969 | A | 10/1990 | Davis |
| 5,070,459 | A | 12/1991 | Van Zanten et al. |
| 5,378,053 | A | 1/1995 | Patient et al. |
| 5,450,324 | A * | 9/1995 | Cikanek .......................... 701/108 |
| 5,508,924 | A * | 4/1996 | Yamashita ....................... 701/22 |
| 5,615,933 | A | 4/1997 | Kidston et al. |
| 5,654,887 | A | 8/1997 | Asa et al. |
| 5,895,100 | A | 4/1999 | Ito et al. |
| 6,488,344 | B2 | 12/2002 | Huls et al. |
| 6,691,013 | B1 | 2/2004 | Brown |
| 7,503,631 | B2 * | 3/2009 | Tezuka .......................... 303/152 |
| 2005/0264102 | A1 | 12/2005 | Tezuka |
| 2006/0255659 | A1 * | 11/2006 | Obai ............................ 303/146 |
| 2010/0017088 | A1 * | 1/2010 | Joyce ............................. 701/73 |

* cited by examiner

*Primary Examiner* — Pamela Rodriguez
(74) *Attorney, Agent, or Firm* — Jerome R. Drouillard; David B. Kelley

(57) ABSTRACT

A traction control method is provided for dynamically maintaining safe driving traction between a tire (12) and a driving surface in a decelerating motor vehicle (10) through a modulated braking device (18, 24). The method monitors the acceleration response of a tire (12) to a torque change induced by modulation of a braking device (18, 24). Observation of the acceleration profile over time is used to determine whether additional braking torque or pressure can be applied without causing the tire (12) to slip. A Traction Reserve value is computed through observing the acceleration trend of the tire (12) over time after a single change in torque, whether that change is accomplished as an increase or a decrease.

19 Claims, 7 Drawing Sheets

TRACTION CONTROL METHOD

CROSS REFERENCE TO RELATED APPLICATIONS

None.

BACKGROUND OF THE INVENTION

1. Field of the Invention

A traction control method for dynamically maintaining safe driving traction between a tire and a driving surface in a decelerating motor vehicle, and more particularly toward a traction control method as implemented through a modulated braking device.

2. Related Art

When slowing a motor vehicle, it is important to maintain adequate traction between the tires and the road surface. Vehicle deceleration can be accomplished by way of traditional braking techniques, for example, disc and or brake systems implemented at the vehicle tires, by shaft gearbox and/or drive train braking systems, by regenerative braking systems such as those used to generate electricity or compress air, or by other means.

Traditional braking systems implemented at the vehicle tire have been made more effective by the so-called antilock braking techniques, wherein tire speeds are monitored, and braking devices modulated independently of one another so as to prevent the dangerous loss of tire traction. The prior art has shown that stability reserve calculations can be made while an automobile tire is in motion to determine whether brake pressure should be increased or decreased in an antilock braking scenario. One example of calculating a stability reserve may be found in U.S. Pat. No. 5,070,459 to Van Zanten et al., issued Dec. 3, 1991, the entire disclosure of which is hereby incorporated by reference.

Prior art techniques for calculating the stability reserve have relied on a sequence of events that include the steps of applying brake pressure followed by a pressure release and then an evaluation of the net effect caused by the transitory pressure impulse. When it is time to repeat the sequence, the system resets itself using the new tire stability calculation as a baseline. This series of events is repeated over and over again in rapid succession until the demand abates.

This stability reserve calculation methodology is a rather slow process as the sequence of events (calculate reserve—apply impulse—recalculate reserve—set new baseline) must be repeated throughout each correction cycle. In an emergency stop situation, every millisecond is precious.

There is therefore a need and desire to improve the performance of antilock brake systems to operate faster and with better response times. Furthermore, there is a desire to extend the application of antilock braking techniques to non-traditional braking systems, including regenerative braking systems, with similar traction control benefits.

SUMMARY OF THE INVENTION

The subject invention contemplates a traction control method for dynamically maintaining safe driving traction between a tire and a driving surface in a decelerating motor vehicle through a modulated braking device. The method comprises the steps of: 1) determining an Acceleration Disturbance near the time that the torque applied to a tire is changed; 2) determining a Reference Difference by determining the difference between the Tire Acceleration and the Initial Acceleration; 3) determining a Disturbance Difference by determining the difference between the Tire Acceleration and the Acceleration Disturbance; 4) calculating a Total Reference Difference by summing multiple Reference Differences from multiple measurements of Tire Acceleration; 5) calculating a Total Disturbance Difference by summing multiple Disturbance Differences from multiple measurements of Tire Acceleration; and 6) comparing the Total Reference Difference to the Total Disturbance Difference. If (braking) torque was increased and Total Reference Difference is small and the Total Disturbance Difference is large, then the Traction Reserve is large. However, if (braking) torque was decreased and Total Disturbance Difference is small and the Total Reference Difference is large, then the Traction Reserve is very small.

Alternatively, the Traction Reserve can be calculated by the steps of: 1) estimating the slope of the μ-slip curve from the trend of the Tire Acceleration after the torque applied to a tire is changed; and 2) If the slope is small or negative then the Traction Reserve is very small or negative, but if the slope is large and positive then the Traction Reserve is large and positive.

The subject method is distinguished from prior art techniques through its reliance upon the measurement of rotational acceleration rather than rotational velocity. Although measured tire rotational, i.e. angular, acceleration is an inherently noisy signal, its use in traction control determinations enables faster modulation response times for several reasons. Firstly, an acceleration signal will always inherently respond more quickly than its corresponding velocity signal. Furthermore, the ability to observe a transient response in the tire after a single modulation, i.e. a braking impulse, means that the braking pressure or braking torque can be applied closer to its optimal level while assessing the traction condition. Thus, by observing the acceleration trend over time for each single change in torque, a faster response, i.e. modulation, of the braking system can be implemented.

Accordingly, the subject invention enables quicker response times than prior art techniques because it is only necessary to measure the change in tire acceleration after a single torque change imposed on the tire in either the positive or negative direction. Said another way, in comparing prior art techniques which rely upon observation of rotational velocity before a positive torque change and then following a negative torque change, the subject method relies upon observation of rotational acceleration following either a positive or a negative torque change. The subject technique enables a modulated system to respond more frequently over a given period of time. This is because an evaluation of tire stability can be performed after the same pressure or torque change that is used to change the prevailing torque. Furthermore, initial values, i.e. the first rotational acceleration, are learned as part of the evaluation of the preceding Traction Reserve determination. Furthermore, fewer torque/pressure changes are needed to make an evaluation as compared to prior art techniques. Since only a single torque change is needed for each assessment according to the present invention, the control can generally be done more transparently, i.e., less noticeably. Whereas frequent torque changes characteristic of prior art techniques can generate vibration and noise perceptible by the vehicle occupants.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
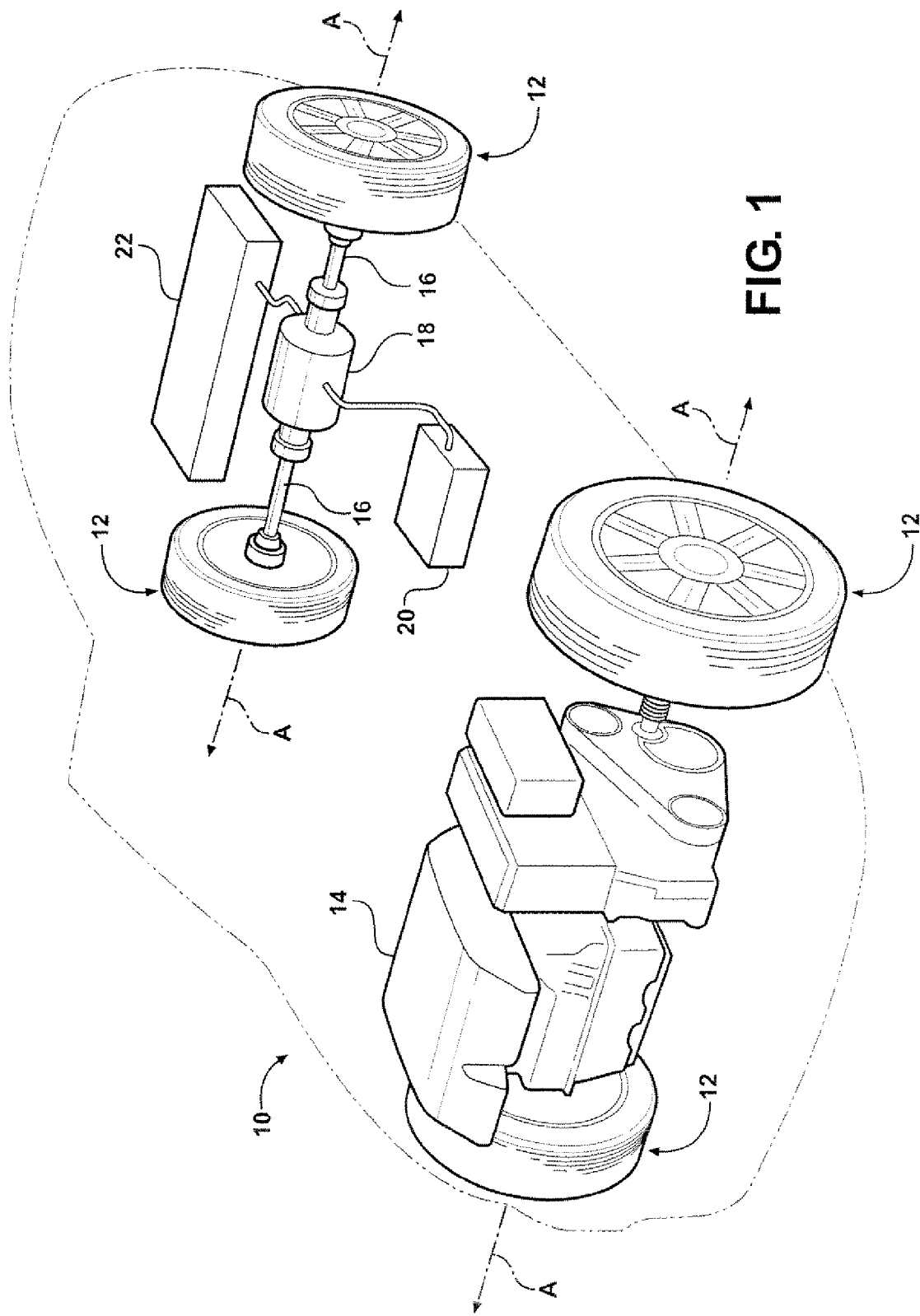
FIG. 1 is a simplified perspective view of a motor vehicle including an exemplary regenerative braking system operatively associated with its two rear tires, of the type modulated in accordance with the principles of this invention.

Referring to the Figures, wherein like numerals indicate like or corresponding features throughout the several views, an exemplary motor vehicle is generally shown in phantom at 10 having the typical plurality of tires, generally indicated at 12, maintained in contact over a driving surface. In this view, the two forward tires 12 are shown in operative connection with an engine and transmission driveline assembly 14 in a somewhat traditional front tire drive arrangement. The two rearward tires 12, however, are joined through respective axle half shafts 16 to a regenerative braking device 18. The regenerative braking device 18 is selectively engaged and disengaged through commands issued by a control module 20 depicted in exemplary fashion. In this example, the regenerative braking device 18 is of the type which converts kinetic tire energy to electricity when actuated, and then stores that electricity in a battery 22. However, those of skill in the art will envision other modes of regenerative braking devices, including but not limited to compressors which, when activated, compress a gas such as air and store the air in an onboard pressure tank. Other types of regenerative braking devices are also possible. Regardless of the type employed, the regenerative braking device 18, when actuated, causes a torque change in the associated tires 12 which results in a deceleration of the motor vehicle 10. Simultaneously with the torque change, energy is converted from the decelerating tires 12 and then stored in an appropriate receptacle. The subject invention comprises a traction control method for dynamically maintaining safe driving traction between each tire 12 and its driving surface while the vehicle 10 is decelerating. This is accomplished by modulating either the regenerative braking device 18 as shown in FIG. 1, or through a more traditional braking system as will be described subsequently in connection with FIG. 5.

Figure 4:
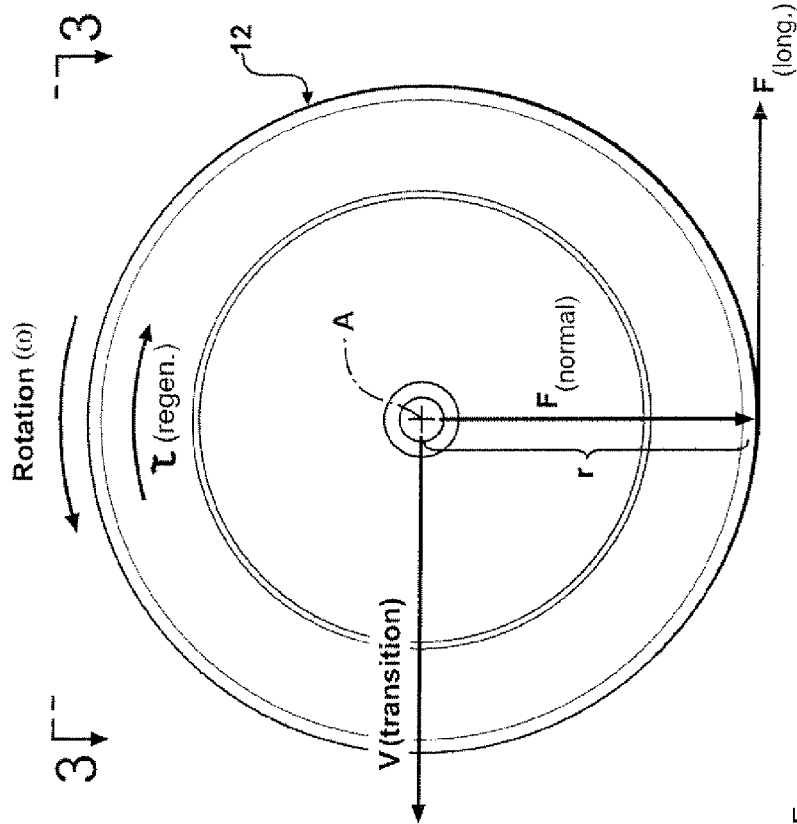
FIG. 4 is a side elevation view of the tire in FIG. 3 depicting the various force and velocity vectors exhibited by a tire in rolling contact with a driving surface.
Figure 2:
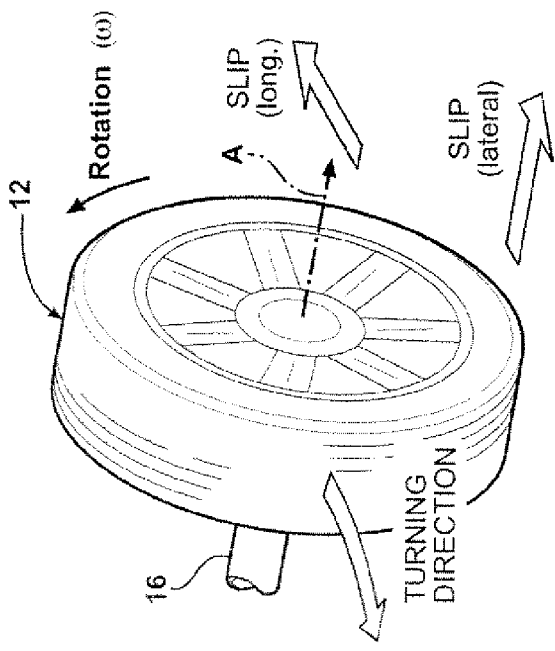
FIG. 2 is a diagrammatic view of a vehicular tire in rotation and depicting through directional arrows slippage that occurs in the longitudinal and lateral directions when the tire is turning a corner.
Figure 3:
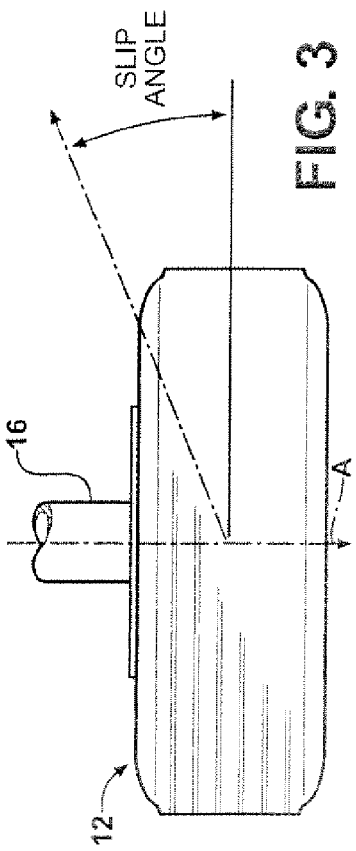
FIG. 3 is a top view of the tire depicted in FIG. 2.

Turning now to FIGS. 2-4, a tire 12 is shown in isolation as the subject of a traction control method according to the subject invention. The tire 12 rotates about a central axis A which passes through its axle half shaft 16 (in the case of a regenerative braking device as shown in FIG. 1) or through its stub axle or other rotational support feature. A longitudinal direction is defined by the central axis A comprising a direction normal to the central axis A and one in which the tire translates in a positive direction. This is shown in FIG. 4. If the tire 12 is turning a corner, as suggested by the turning direction arrow in FIG. 2, the tire also encounters movement in the lateral direction, which comprises a vector extending parallel to the central axis A. Frictional contact between the tire 12 and its driving surface in a decelerating motor vehicle will result in slippage in the longitudinal direction, and also in the lateral direction if the tire 12 is cornering. This slippage is depicted in FIG. 2, with the resulting slip angle illustrated in FIG. 3. When a braking device is actuated, be it a regenerative braking device 18 or a traditional caliper, drum or other technique, a torque is applied to the tire 12 in a direction opposite to its angular rotation. The resistive torque is thus effective to decelerate the tire 12 and help slow the vehicle 10.

Figures 5, 5A:
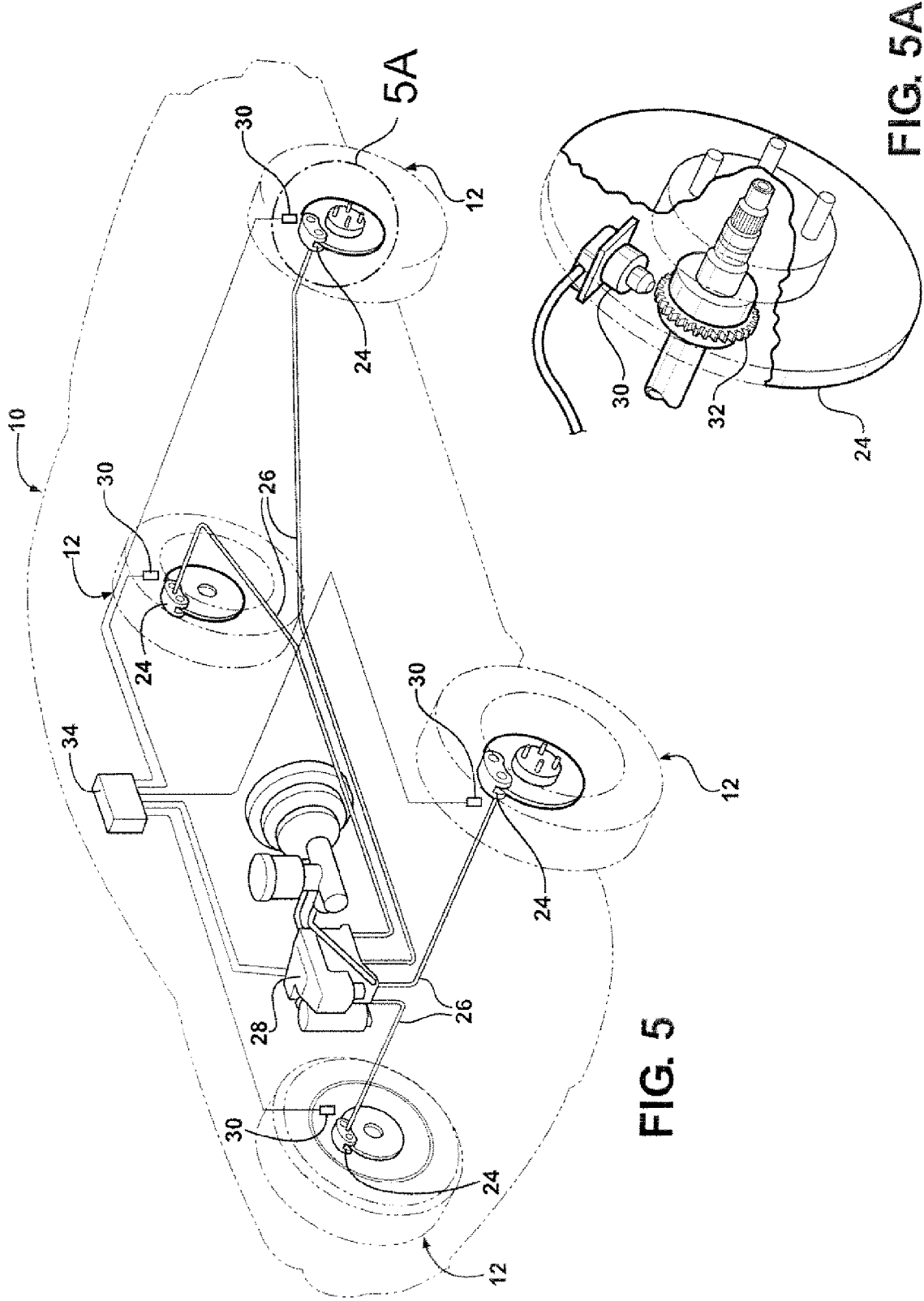
FIG. 5 is a schematic view of a motor vehicle fitted with an antilock braking system associated with caliper type disc brakes fitted at each of its four tires, of the type modulated in accordance with the principles of this invention.

FIG. 5 illustrates a non-regenerative braking configuration, wherein caliper type disc brake devices 24 are associated with each tire 12 and connected through hydraulic lines 26 to a modulator unit 28. Conventional braking devices can take other, i.e., non-caliper, forms. All such conventional braking devices include a friction element and an opposed rotating member associated with tire 12. To activate the braking device 24, pressure is applied between the friction element and the opposed rotating member. Sensors 30 at each tire 12 monitor its rotational speed, such as by the movement of a gear pulser 32 which rotates with the associated tire 12. A control module 34 receives feedback from each of sensor 30 and then manipulates the modulator unit 28 in accordance with the traction condition at each tire 12. The subject traction control method works equally well with a traditional braking device arrangement 24 as depicted in FIG. 5 and with the regenerative braking system 18 as shown in FIG. 1.

In accordance with the subject method, information from tire sensors 30 are used to measure a first rotational acceleration of each tire 12. It will be understood that some or all of the tires 12 utilized by the vehicle 10 may be under the control of the subject traction control method. Therefore, all such tires 12 under control of the subject method are measured to obtain a first rotational acceleration for that tire 12. The braking device 18, 24 is actuated for a predetermined duration of time, i.e. pulsed, to cause a change in the rotational acceleration of the tire 12. The braking device 18, 24 induces a torque change in the tire 12 to assist deceleration as may be dictated by the vehicle operator. A second rotational acceleration of the tire 12 is measured immediately following the actuating step. Then, the difference between the first and second rotational accelerations is calculated. The control module 20, 34 used in connection with the subject method then evaluates whether it is appropriate to repeat the step of actuating the braking device 18, 24 as a function of the calculated difference in rotational acceleration of the tire 12.

Figure 6:
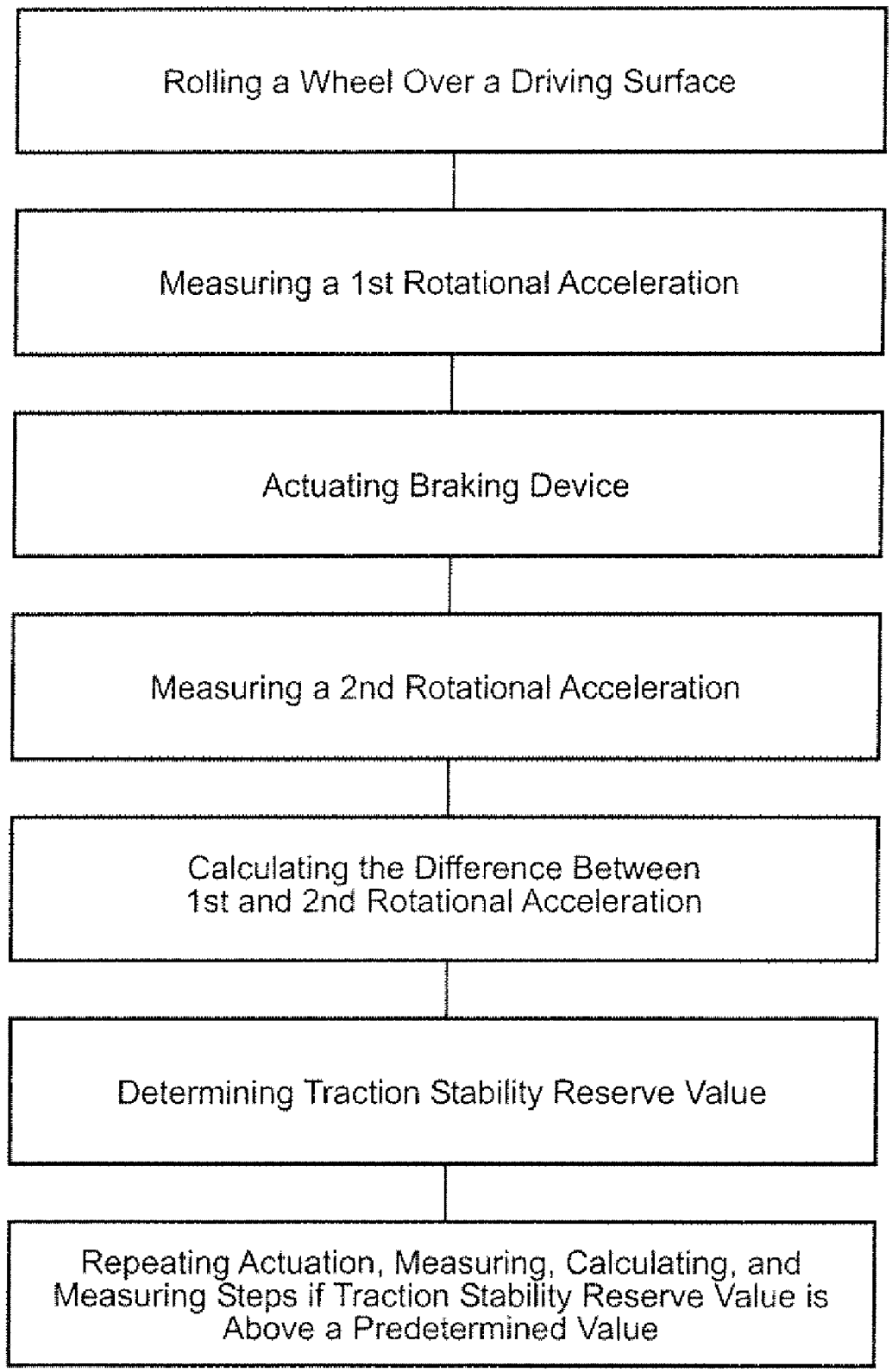
FIG. 6 is a flow diagram representing the sequence of events carried out through application of the subject invention.

While the evaluating step can be accomplished in a variety of ways, the preferred method is to calculate a longitudinal Traction Reserve value for the tire in the longitudinal direction and also a lateral stability reserve value for the tire 12 in the lateral direction. Prior art U.S. Pat. No. 5,070,459 describes a technique for calculating Traction Reserve values using measured tire velocity. A similar algorithm is implemented for calculating longitudinal and lateral Traction Reserve values using the measured tire accelerations as an indication whether the tire 12 is capable of providing additional braking force. If additional braking force is available, without sacrificing driving traction, then the sequence can be repeated by again actuating the braking device 18, 24 and measuring a new second rotational acceleration of the tire 12, calculating the change in rotational acceleration and again evaluating whether the tire 12 is capable of providing more braking force based on whether its calculated Traction Reserve value, in either one or both of the longitudinal and lateral directions, exceeds a predetermined value. The predetermined value is that reference value at which excessive tire slip is most likely to occur. That is, while some slip is necessary to perform any braking maneuver, this invention is aimed at preventing more than the minimum amount of slip necessary. As known well to those of skill in the art, this typically can be expressed in terms of a graphed line plotting friction (mu or μ) against slip. The so-called μ-slip curve is indicative of the Traction Reserve at the measured conditions. The sequence of events is illustrated in succession in FIG. 6.

According to the subject invention, a modulated braking device 18, 24 can be pulsed more frequently than a prior art technique operating at the same evaluation times. That is because the method of the subject invention relies upon the acceleration signal which will always inherently respond more quickly than the velocity signal. Furthermore, the ability of the subject method to observe a transient response in the tire 12 after a single modulation of the braking device 18, 24 means that the counteracting torque on the tire 12 can be made closer to the optimal level (i.e., maximum) while simultaneously assessing the Traction Reserve value in either the longitudinal and/or lateral directions.

Accordingly, a braking device 18, 24 whether regenerative or traditional, is operatively connected to a tire 12 and then modulated to make small, rapid changes in torque applied to the tire 12 in a decelerating operation. The transient response of the tire 12 is observed using tire speed sensors 30, which are typically installed near the tire end and used to support a traction control method of this invention. Alternatively, the sensors 30 can be located on a rotating shaft which can be correlated to each tire 12 and then used to calculate the tire's rotational acceleration. Prior to a changing torque being applied to the tire 12, a reference acceleration for the tire is determined. This reference acceleration becomes the first rotational acceleration described above. Near the time that a change in torque is applied to the tire 12, an acceleration disturbance for the tire 12 is determined. For some time after the torque is changed, the tire 12 acceleration is monitored via measurement of a second rotational acceleration. The difference between the first and second rotational accelerations are calculated to determine a Referenced Difference. The difference between the tire acceleration and the acceleration disturbance is calculated to determine a Disturbance Difference. A value, which may be referred to as Total Reference Difference, is then calculated by summing values of Referenced Differences that occur over time. A value, referred to as Total Disturbance Difference, is calculated by summing values of Disturbance Differences that occur over time. The longitudinal and/or lateral Traction Reserve values can be calculated by comparing the values of the Total Disturbance Difference and Total Reference Difference with any or all of the following: constant values, each other, or recent values determined after other torque changes. In general, a larger Disturbance Difference and a smaller Reference Difference are indicative of a greater Traction Reserve value and thus serve as an indication that a tire 12 is capable of providing more braking force.

The Reference Difference may be determined by monitoring the rotational acceleration and identifying an extreme point, which may be either a minimum or a maximum depending on the sign of the torque change. The Reference Difference may alternatively be determined by adding a value to the reference acceleration that is determined from the magnitude of the torque change applied to the tire 12.

While a generally constant torque is applied to a tire 12, the torque is modulated so that a change in torque is followed by a nearly equal change in torque that is of the opposite sign. Throughout the modulation of torque, a reference speed is determined that is changing at approximately the same rate as the longitudinal motion of the tire 12. Of course, "longitudinal" in this context refers to the coordinate system of the tire 12, which is not necessarily that of the vehicle 10. In this context, "longitudinal motion" is the translational motion of the tire 12 aligned with the motion of the tire tread about the central axis A. For some time after the torque applied to a tire 12 is modulated, the Tire Slip is monitored, where Tire Slip is the value corresponding to a tire speed and a reference speed given by the relationship:

$$\text{slip} = 1 - \text{tire speed} / \text{reference speed}.$$

Near the time that the torque applied to the tire 12 is modulated, a Reference Slip is determined. A value, referred to as Total Tire Slip is calculated by summing values of Tire Slip that occur over time. A value Total Reference Slip is calculated by adding the Reference Slip to the Total Reference Slip every time that a new value of Tire Slip is added to the Total Tire Slip sum. The Traction Reserve value can be calculated by comparing the values of the Total Reference Slip and Total Tire Slip with any or all of the following: constant values, each other, or recent values determined after other torque modulation. See, for example, FIG. 4 of U.S. Pat. No. 5,070,459 for an analogous description of this phenomenon. In general, a smaller Total Tire Slip relative to a Total Reference Slip will be indicative of a greater Traction Reserve value and serves as an indication that a tire 12 is capable of providing more braking force.

To summarize, a Traction Reserve can be calculated by the steps of: 1) determining an Acceleration Disturbance near the time that the torque applied to a tire is changed; 2) determining a Reference Difference by determining the difference between the Tire Acceleration and the Initial Acceleration; 3) determining a Disturbance Difference by determining the difference between the Tire Acceleration and the Acceleration Disturbance; 4) calculating a Total Reference Difference by summing multiple Reference Differences from multiple measurements of Tire Acceleration; 5) calculating a Total Disturbance Difference by summing multiple Disturbance Differences from multiple measurements of Tire Acceleration; and 6) comparing the Total Reference Difference to the Total Disturbance Difference. If (braking) torque was increased and Total Reference Difference is small and the Total Disturbance Difference is large, then the Traction Reserve is large. However, if (braking) torque was decreased and Total Disturbance Difference is small and the Total Reference Difference is large, then the Traction Reserve is very small.

Alternatively, the Traction Reserve can be calculated by the steps of: 1) estimating the slope of the μ-slip curve from the trend of the Tire Acceleration after the Torque applied to a Tire is changed; and 2) If the slope is small or negative then the Traction Reserve is very small or negative, but if the slope is large and positive then the Traction Reserve is large and positive.

Figure 7:
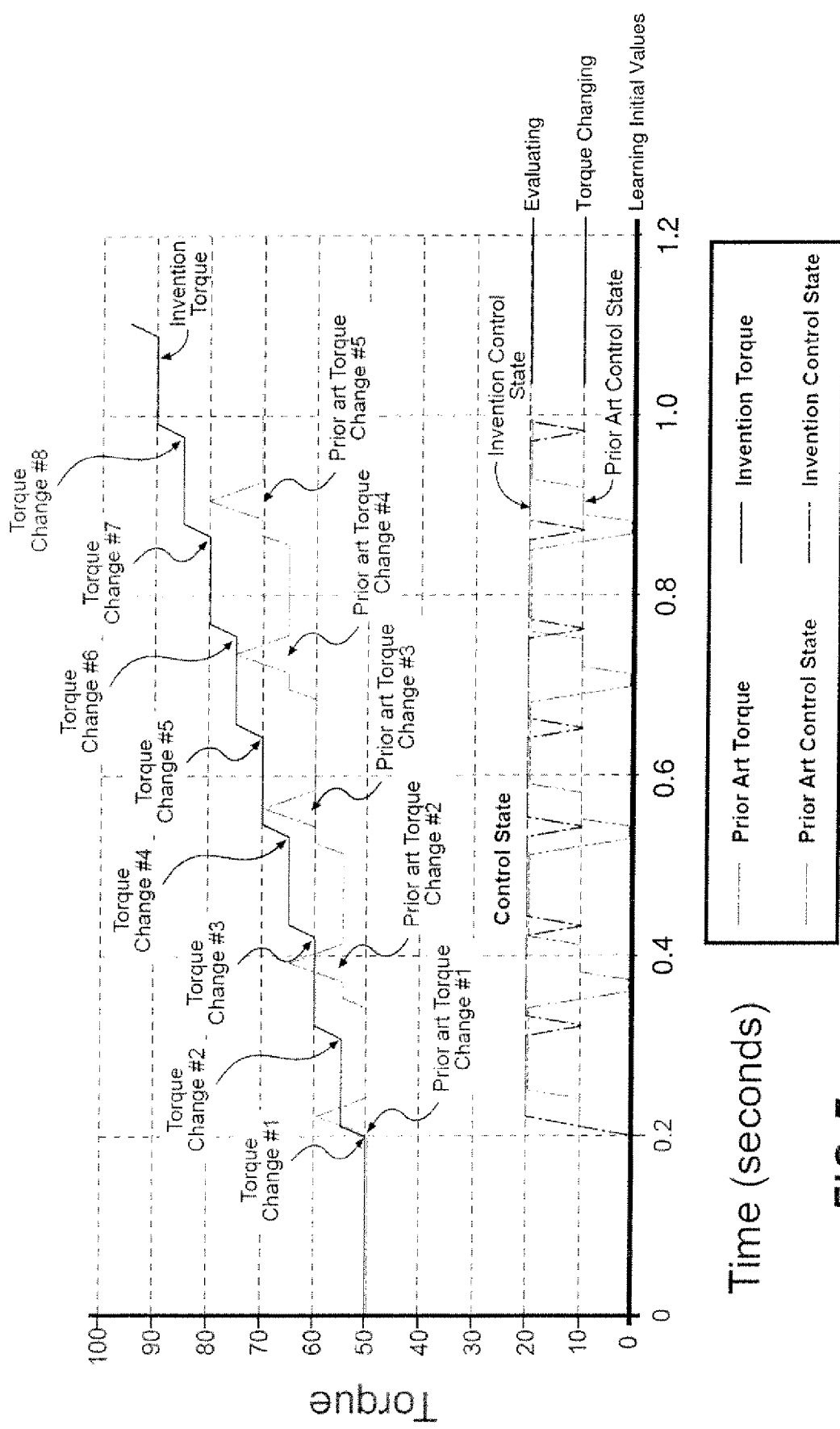
FIG. 7 is a graph of brake pressure/torque over time comparing algorithms used by the subject invention and the prior art to depict the manner in which the subject invention enables faster braking response times and therefore an improved ability to control traction in a decelerating motor vehicle.

In FIG. 7, a graph is presented depicting a comparison of the subject method to a prior art traction control technique such as that described in U.S. Pat. No. 5,070,459. In this illustration, both methods require the same evaluation time and both are able to change brake torque at the same rate, however, the system using the subject invention is able to respond approximately twice as fast over time because the evaluation of tire stability can be performed after the same torque change that is used to change the prevailing torque. Furthermore, initial values for the next evaluation are learned as part of the evaluation of the current tire stability, and furthermore fewer torque changes are needed to make an evaluation. For all of these reasons, the subject invention, which relies upon measurement of tire acceleration rather than tire velocity, is useful as a traction control method for dynamically maintaining safe driving traction between a tire 12 and a driving surface in a decelerating motor vehicle 10.

Figure 8:
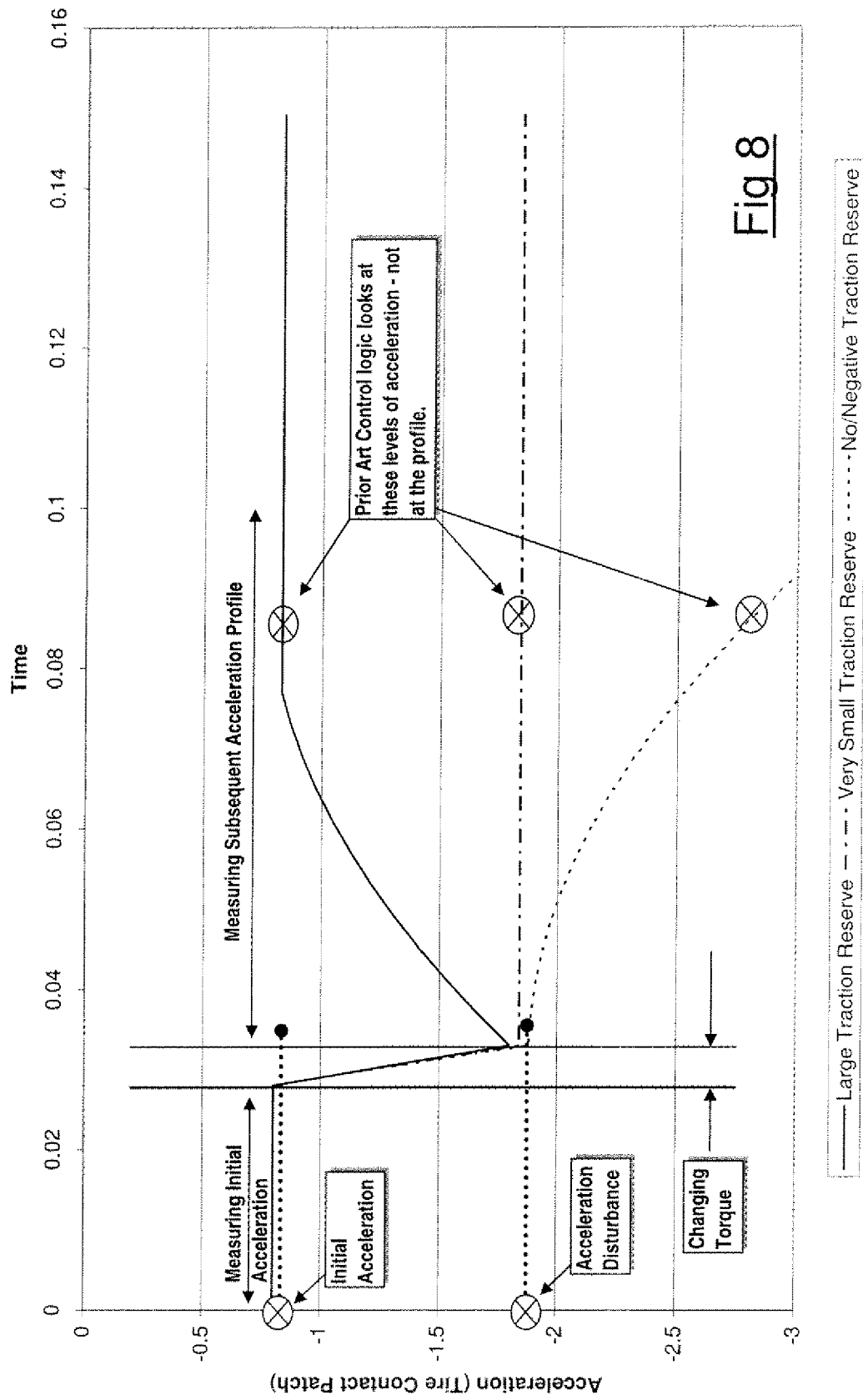
FIG. 8 is a graph showing characteristic trend acceleration profiles after increasing torque.

FIG. 8 is a graph showing acceleration profiles after increasing (brake) torque. It should be here noted that the profiles represent characteristic trends, whereas actual recorded values would typically be very noisy or jagged. In this graph, the specific points are indicated at which a conventional prior art antilock control logic may look at, i.e., sample, the tire's rotational acceleration. The sampling of discrete points is distinguished from the method of the instant invention where instead the acceleration profile over time is observed. Because of noise on the acceleration signals, acceleration-based criteria such as that utilized by the prior art do not generally limit torque increases until there is no longer a Traction Reserve. That is a primary reason why the prior art traction control methods prefer to observe velocity signals rather than acceleration signals, because velocity signals tend to be much smoother and less noisy.

The graph in FIG. 8 applies to the "after increasing (brake) torque" scenario. Here, it is shown that conventional, i.e., prior art, logic typically keeps increasing torque until the very negative acceleration (~−2.8 g) identified on the "No/Negative Traction Reserve" curve is reached. Because the acceleration signals are so characteristically noisy, the threshold at which to stop increasing torque cannot be set at the moderately negative acceleration (~1.8 g) marked on the "Very Small Traction Reserve" curve. If the threshold for determining when to stop increasing torque were set at such a moderate value (~1.8 g), it could be triggered by either a spike in acceleration when the torque is changed or by the noise (not shown) on the acceleration signal as it follows the "Large Traction Reserve" profile. Consequently when evaluating the acceleration signal, prior art logic must use a combination of waiting longer after a torque change and using higher thresholds. The result is that acceleration criteria applied in the prior art technique will not reliably identify when torque increases should be stopped until it is too late—i.e., when excessive slip has developed and there is no traction reserve left. Slip targets can be used to help offset this natural deficiency, but they can reduce the utilization of available traction because the actual optimum slip level depends upon a large number of factors that are not known.

Figure 9:
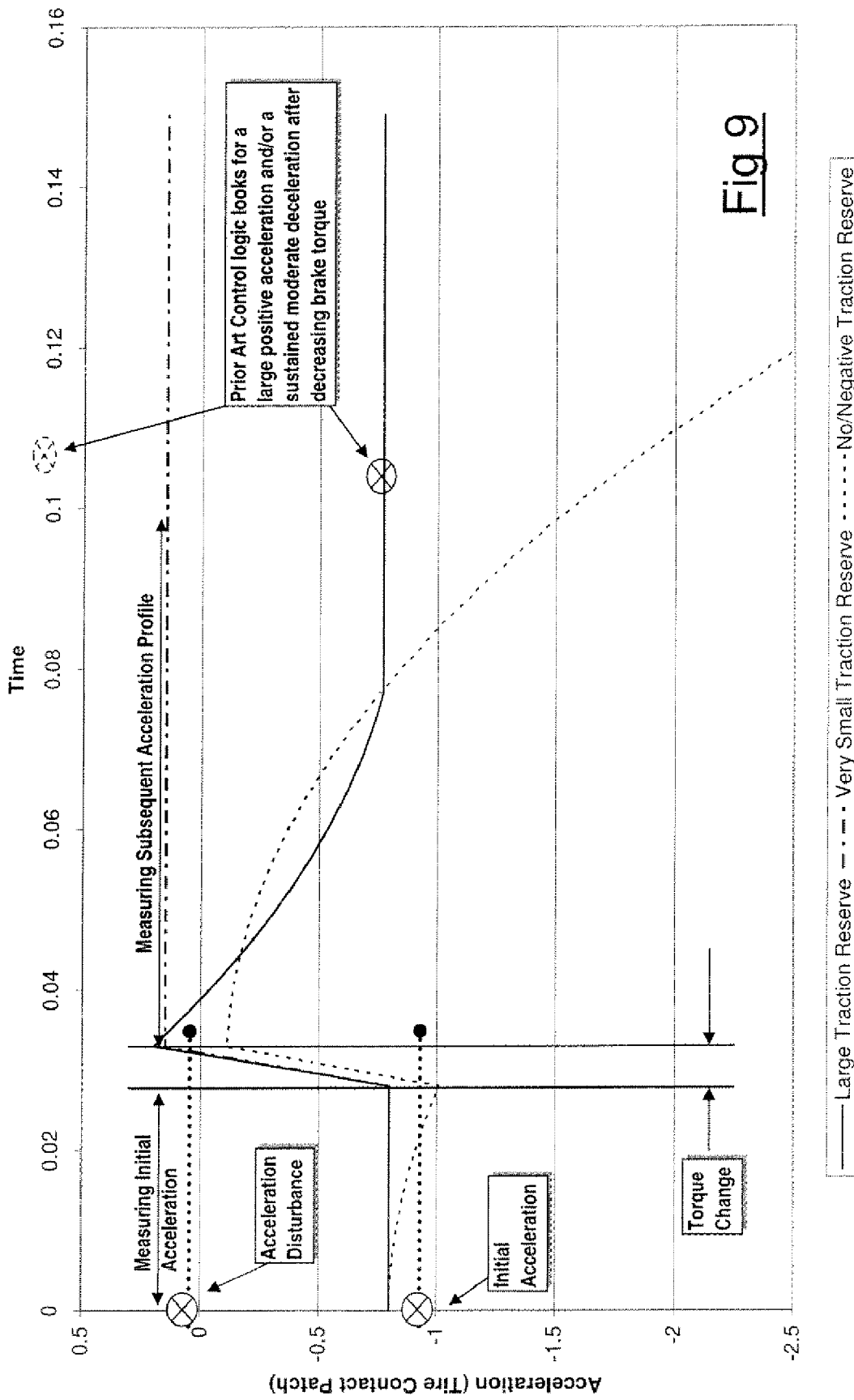
FIG. 9 is a graph as in FIG. 8 but depicting characteristic trend acceleration profiles after decreasing torque.

FIG. 9 is similar to FIG. 8, but shows the acceleration profiles after decreasing (brake) torque. Again, the curves or profiles represent characteristic trends, rather than actual values which are typically quite noisy. Conventional antilock control logic looks for a large positive acceleration and/or a sustained moderate deceleration after decreasing brake torque to assure that a Traction Reserve has been restored. Typically other criteria such as slip are used to speed the response of the control. (The acceleration profile of an applied conventional logic is not shown.) Prior art logic generally decreases torque until significant tire acceleration occurs or a slip target is reached. Any tire acceleration that is more than needed to return to a state of a small Traction Reserve results in degraded use of the available traction. As stated previously, slip targets are one possible technique to improve performance using prior art control logic, but are generally disfavored because they can result in less than optimal use of available traction.

FIGS. 8 and 9 taken together, instruct the skilled artisan to recognize that a Traction Reserve after both torque increases and decreases allows for optimum use of available traction by: 1) commanding torque increases up to a minimal amount of Traction Reserve, and 2) commanding torque decreases only to the point where a minimal amount of Traction Reserve is restored. Thus, the invention can be summarized as follows: 1) (OPTIONALLY) Measure the Initial Acceleration prior to the Torque Change; 2) Make a Torque Change; 2) After the Torque Change make Many Measurements of the Acceleration; 3) Evaluate the Many Measurements of the Acceleration after the Torque (and optionally evaluate also the Initial Acceleration) to calculate a Traction Reserve; 4) After a Torque Change that increases the (braking) Torque, the Traction Reserve is calculated such that it distinguishes between the Acceleration Profiles as shown in FIG. 8; and 5) After a Torque Change that decreases the (braking) Torque, the Traction Reserve is calculated such that it distinguishes between the Acceleration Profiles shown in FIG. 9.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A traction control method for dynamically maintaining safe driving traction between a tire and a driving surface in a decelerating motor vehicle through a modulated braking device, said method comprising the steps of:
   rolling the tire over a driving surface;
   providing a selectively actuated braking device operatively associated with the tire;
   measuring an Initial Acceleration of the tire;
   applying a torque increase to the tire via the braking device;
   making a plurality of Tire Acceleration measurements of the tire immediately following said step of applying a torque;
   calculating a Traction Reserve such than an acceleration profile can be discerned over time; and
   determining whether to make a subsequent torque increase or decrease to the tire via the braking device as a function of the calculated Traction Reserve.

2. The traction control method of claim 1 wherein said step of calculating a Traction Reserve includes the steps of:
   determining an Acceleration Disturbance near the time that the torque applied to the tire is changed;
   determining a Reference Difference by calculating the difference between the Tire Acceleration and the Initial Acceleration;
   determining a Disturbance Difference by calculating the difference between the Tire Acceleration and the Acceleration Disturbance;
   calculating a Total Reference Difference by summing multiple Reference Differences from multiple measurements of Tire Acceleration;
   calculating a Total Disturbance Difference by summing multiple Disturbance Differences from multiple measurements of Tire Acceleration;
   comparing the Total Reference Difference to the Total Disturbance Difference; and concluding the Traction Reserve is large if torque was increased and Total Reference Difference is small and the Total Disturbance Difference is large, but concluding the Traction Reserve is small if torque was decreased and Total Disturbance Difference is small and the Total Reference Difference is large.

3. The traction control method of claim 1 wherein said step of calculating a Traction Reserve includes the steps of:
estimating the slope of a μ-slip curve determined from data collected during said step of making a plurality of Tire Acceleration measurements; and
concluding the Traction Reserve is very small or negative if the slope of the μ-slip curve is small or negative, but concluding the Traction Reserve is large and positive if the slope of the μ-slip curve is large and positive.

4. The traction control method of claim 1 wherein said step of applying a torque increase includes storing converted energy from the decelerating tire.

5. The traction control method of claim 4 wherein said step of storing converted energy includes generating electricity.

6. The traction control method of claim 5 wherein said step of storing converted energy includes storing the electricity in a battery.

7. The traction control method of claim 4 wherein said step of storing converted energy includes compressing air.

8. The traction control method of claim 1 wherein the braking device includes a friction element and an opposed rotating member associated with tire, and wherein said step of applying a torque increase includes applying pressure between the friction element and the opposed rotating member.

9. The traction control method of claim 1 wherein said step of applying a torque increase has a total duration of less than one second.

10. The traction control method of claim 1 wherein the braking device includes a friction element and an opposed rotating member associated with the tire, and wherein said step of applying a torque increase includes applying pressure between the friction element and the opposed rotating member.

11. A traction control method for dynamically maintaining safe driving traction between a tire and a driving surface in a decelerating motor vehicle through a modulated braking device, said method comprising the steps of:
rolling the tire over a driving surface;
providing a selectively actuated braking device operatively associated with the tire;
applying a torque increase to the tire via the braking device;
making a plurality of Tire Acceleration measurements of the tire immediately following said step of applying a torque;
calculating a Traction Reserve such that an acceleration profile can be discerned over time; and
determining whether to make a subsequent torque increase or decrease to the tire via the braking device as a function of the calculated Traction Reserve.

12. The traction method of claim 11 wherein said step of calculating a Traction Reserve includes the steps of
estimating the slope of a μ-slip curve determined from data collected during said step of making a plurality of Tire Acceleration measurements; and
concluding the Traction Reserve is very small or negative if the slope of the μ-slip curve is small or negative, but concluding the Traction Reserve is large and positive if the slope of the μ-slip curve is large and positive.

13. The traction control method of claim 11 wherein said step of applying a torque increase includes storing converted energy from the decelerating tire.

14. The traction control method of claim 13 wherein said step of storing converted energy includes generating electricity.

15. The traction control method of claim 14 wherein said step of storing converted energy includes storing the electricity in a battery.

16. The traction control method of claim 13 wherein said step of storing converted energy includes compressing air.

17. The traction control method of claim 11 wherein the braking device includes a friction element and an opposed rotating member associated with tire, and wherein said step of applying a torque increase includes applying pressure between the friction element and the opposed rotating member.

18. The traction control method of claim 11 wherein said step of applying a torque increase has a total duration of less than one second.

19. The traction control method of claim 11 wherein the braking device includes a friction element and an opposed rotating member associated with the tire, and wherein said step of applying a torque increase includes applying pressure between the friction element and the opposed rotating member.

* * * * *